(12) United States Patent
Terashima et al.

(10) Patent No.: US 6,473,047 B2
(45) Date of Patent: Oct. 29, 2002

(54) CONTACTLESS IDENTIFICATION SYSTEM, METHOD OF CONTACTLESS IDENTIFICATION, AND ANTENNA COIL

(75) Inventors: Masahiro Terashima; Shinichiro Fukouka, both of Kyoto (JP)

(73) Assignee: Omron Corporation, Kyoto (JP)

(*) Notice: Subject to any disclaimer, the term of this patent is extended or adjusted under 35 U.S.C. 154(b) by 0 days.

(21) Appl. No.: 09/919,872

(22) Filed: Aug. 2, 2001

(65) Prior Publication Data

US 2002/0024441 A1 Feb. 28, 2002

(30) Foreign Application Priority Data

Aug. 4, 2000 (JP) .......................... 2000-237656

(51) Int. Cl.$^7$ .............................................. H01Q 11/12
(52) U.S. Cl. ....................... 343/741; 343/866; 343/895; 340/551; 340/572.1
(58) Field of Search ................................ 343/702, 895, 343/741, 742, 866, 867; 340/521, 551, 572.1, 572.3, 572.7, 573.4

(56) References Cited

U.S. PATENT DOCUMENTS

| | | | | |
|---|---|---|---|---|
| 4,866,424 A | * | 9/1989 | Parks .......................... 324/243 |
| 5,392,028 A | * | 2/1995 | Pichl .......................... 340/521 |
| 5,689,184 A | * | 11/1997 | Jeffers et al. ................ 324/243 |
| 5,691,731 A | * | 11/1997 | van Erven ................... 343/742 |
| 6,249,258 B1 | * | 6/2001 | Bloch et al. ................. 343/742 |

FOREIGN PATENT DOCUMENTS

JP 6-152473 5/1994

* cited by examiner

*Primary Examiner*—Tan Ho
(74) *Attorney, Agent, or Firm*—Dickstein Shapiro Morin & Oshinsky LLP

(57) ABSTRACT

A contactless identification system and an antenna coil capable of reliable transmission with multiple tags without a requirement of uniform distance from tag to antenna. The system also permits differing tag versus antenna planar orientations during tag passage through the antenna opening. The system creates a contactless identification system with a shaped antenna coil having an opening at the center, whereby the antenna section is transferred or varied in position or orientation with respect to piled objects with attached tags, so that the objects pass through the opening, producing transmission between the antenna coil and each of the tags.

23 Claims, 7 Drawing Sheets

Antenna Assembly

CONTACTLESS IDENTIFICATION SYSTEM, METHOD OF CONTACTLESS IDENTIFICATION, AND ANTENNA COIL

This application claims priority from Japanese Patent Application No. 237656/2000, the disclosure of which is incorporated herein by reference.

FIELD OF THE INVENTION

This invention relates to a contactless identification system for logistic systems, object management systems, an antenna coil and associated contactless identification device utilized in a contactless identification system.

BACKGROUND OF THE INVENTION

Conventionally, a logistic system or an objects management system of this kind already exists, e.g. a library management system handling the checkout and return of a book. In such a system, a management tag (data carrier) is fixed with paste or the like on each of the books to be managed by the library, and when a checkout or return process is taken, the book is set on the predetermined position near the antenna of the identification device. Data transmission then takes place between the tag and the antenna of the identification device by such transmission means as disclosed by U.S. Pat. No. 2,683,305, for example. That is to say, a transmission signal, generated by modulation of the set carrier frequency, is sent from the antenna of the identification device to the tag. The tag performs reading/writing, as well as electric power supply receipt, in accordance with the signal transmitted from the identification device antenna. Transmission then takes place by the so-called Load Switching Method in which the required data may be sent out from the tag to the antenna of the identification device by altering the load impedance of the antenna on the tag, in accordance with the read-out data on the tag side.

In this manner, the book checkout and return process is carried out via antenna-tag transmission, once the identification device has obtained the necessary information through the antenna.

However, the following problems exist with this conventional technology.

When a number of books pile up, the distances between the tags fixed on the books and the antenna also increases. When transmission is performed between the fixed antenna and the multiple tags in such arrangement, some tag distances from the antenna are longer than others and thus the transmission distance may be too great. FIG. 9 shows magnetic lines generated by the fixed antenna coil. In such a magnetic field, the magnetic force at each of points A, B, C, D and E, where the multiple tags are positioned at various distances from the antenna coil, are shown by the length of the magnetic vector. (All tags are assumed to be positioned parallel to the antenna coil.) Here, the tag at point A crosses over the maximum magnetic force generated in the antenna coil, and maximum energy is supplied to the tag. The farther a crossing point lies from the antenna coil along the line intersecting the antenna coil at right angles, such as at points B and C, the weaker the magnetic force becomes, and the weaker the energy supplied to the coil. Also, the farther a crossing point lies from the center of the antenna coil along the lines parallel to the antenna coil, such as points D and E, the weaker the component of the magnetic force crossing over the tag becomes, the weaker the energy supplied to the coil. FIG. 10 shows different levels of electric power at different amplitudes, as supplied to a tag at each point. In this manner, some of the multiple tags, positioned at various distances from the fixed antenna, are at an insufficient distance for transmission. For this reason, the conventional technology suffers from not being able to read all tags accurately.

Another problem with the conventional technology is that multiple tags are not be read accurately at once, as mutual interference between the tags fixed on the books lowers the resonance frequency of the tags.

In order to resolve this problem, one known method is to preset tag resonance frequencies to higher frequencies. However, a discrepancy occurs between the tag resonance frequency and the antenna of the identification device, such that the transmission distance deteriorates considerably and results in an insufficient reading of all multiple books in the pile.

This invention resolves the above mentioned problems associated with the conventional technology. The purpose of this invention is to provide a contactless identification system and the antenna coil with a reliable transmission path for multiple tags.

SUMMARY OF THE INVENTION

The invention provides a contactless identification system comprising a data carrier for attachment to objects, and an antenna section which communicates with the data carrier, where the antenna section includes an antenna coil with an opening to accommodate the objects.

Also, the system can comprise a guidance means to guide transfer or movement of the antenna coil with respect to the objects set at the predetermined position so that the objects pass through said opening.

The system can also comprise an antenna transfer means to transfer or vary the position of the antenna coil with respect to the objects set at the predetermined position so that the objects pass through the opening.

Another embodiment may comprise an objects transfer means to transfer or move the objects with respect to the antenna coil set at the predetermined position so that the objects pass through the opening.

Also, this invention relates to the data carrier to be attached to the objects and an antenna coil which is utilized for a contactless identification system, in which the identification device possesses an antenna section which communicates with the data carrier, the antenna coil possessing an opening to accommodate objects.

This invention also relates to the contactless identification means for identifying objects by performing transmission between the data carrier attached to the objects and the antenna coil possessing an opening, including a step to perform transmission with said data carrier after relative transfer of said objects and the antenna coil, so that the data carrier attached to the objects passes through the antenna opening.

Also, the step to relative transfer or move the objects and the antenna coil with respect to each other and to perform transmission with the data carrier includes a step to set the objects at a predetermined position and a step to move or transfer the antenna coil position so that each data carrier attached to the objects passes through the opening.

Also, the step to transfer the antenna coil includes a step shaking the antenna coil around a shaft supporting the antenna coil thereon with room allowed for shaking, so that each of the data carriers attached to the objects passes through the opening.

Also, the step to relative transfer the objects and the antenna coil and to perform transmission with the said data carrier, includes a step to transfer the objects against the antenna coil set at a predetermined position so that each data carrier attached to the objects passes the opening.

DETAILED DESCRIPTION OF THE INVENTION

Figure 1:
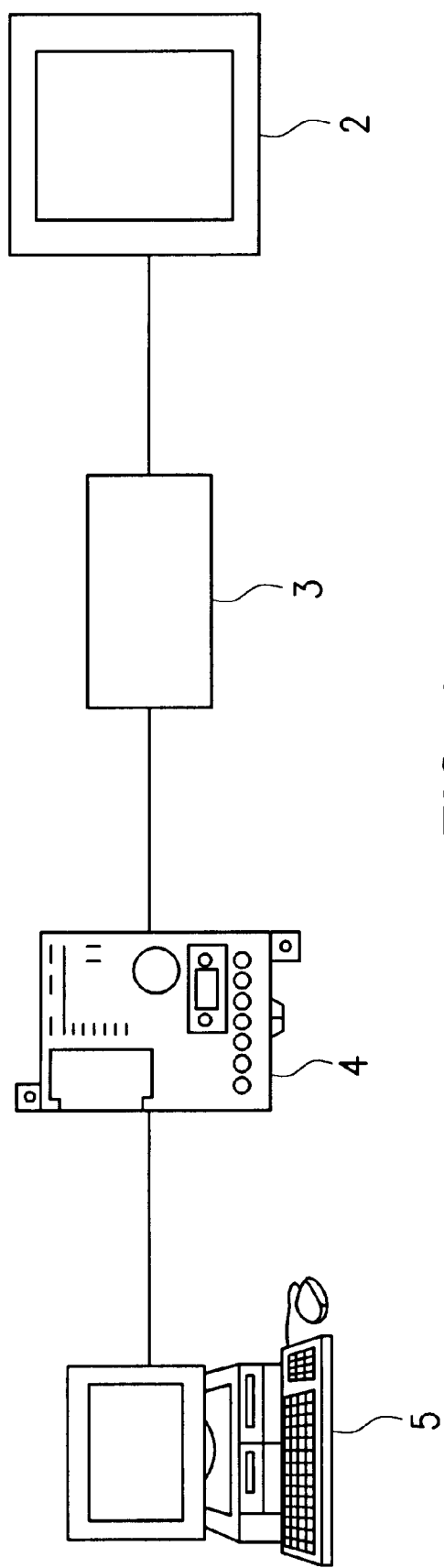
FIG. 1 shows the construction of the identification device of the contactless identification system according to a practical embodiment of the invention.

The first embodiment with reference to illustrated figures, is explained below. Referring to FIG. 1, the identification device 1 is mainly comprised of an antenna section (2), an amplifier section (3), a controller section (4), and a PC (5) (personal computer).

Figure 2:
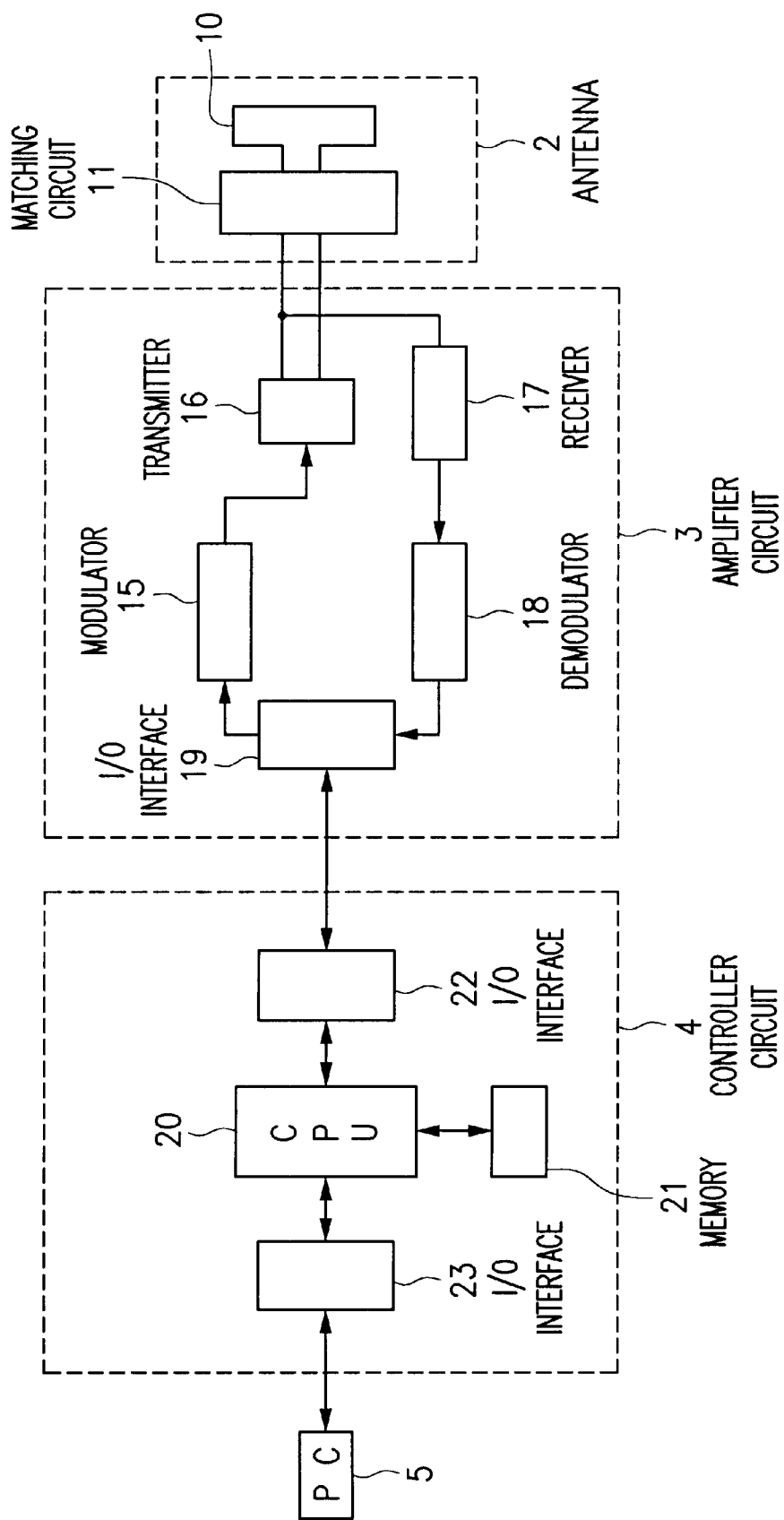
FIG. 2 shows the outlined composition for each section of the contactless identification system identification device of the FIG. 1 embodiment.

Turning to FIG. 2, the amplifier section (3) is mainly comprised of a modulating circuit (15), a transmitting section (16), a receiving section (17), a demodulating circuit (18), and an input/output IF (19) (interface). The modulating circuit (15) is to modulate the high frequency generated by the oscillator circuit, which is not illustrated, in response to data or command output from the CPU (20) of the controller section (4). In the transmitting section (16), the modulated signal from the modulating circuit (15) is amplified by the amplifier, which is not illustrated, to drive the antenna coil (10). The signal received by the antenna section (2) is led through the receiving section (17) to the demodulating circuit (18) to be demodulated. The input/output IF (19) controls signals to and from the controller section (4).

The controller section (4) is mainly comprised of a CPU (20), a memory (21), and an input/output IF (22) and (23). The CPU (20) controls data writing or reading on the tag (30). The memory (21) stores data, etc., to be used for programming and processing to control transmission with the tag (30). The input/output IF (22) controls the signals to and from the amplifier section (3), and the input/output IF (23) controls the signals to and from the PC (5), which is the host device.

The PC (5) mainly includes an indication section such as display, etc., an input section such as keyboard, etc., a CPU to calculate and judge processes, a memory section with RAM (random access memory), to store programs and data, and ROM (read only memory), etc., and auxiliary devices such as HD (hard disks). Controller section (4) control, processing data obtained from the tag, and other information is also displayed. signals are transmitted between the PC (5) and the controller section (4) by a serial interface, RS232C for example.

The antenna section (2) comprises an antenna coil (10) and a matching circuit (11) and is connected to the transmitter (16) and receiver (17) within the amplifier circuit (3).

Figure 3:
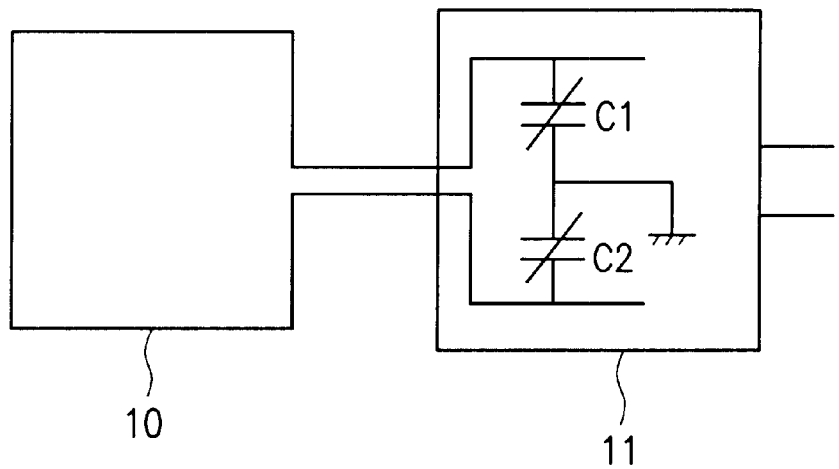
FIG. 3 shows the composition of the antenna section.

Turning to FIG. 3, the antenna coil (10) has a square shape and is made of metal pipe or wire material. Both edges of the antenna coil (10) are extended out in parallel and are connected to the amplifier section (3) by coaxial cable through the matching circuit (11). In case the matching circuit (11)-antenna coil (10) cable is short, the matching circuit (11) may be integrated into the amplifier section (3) for the composition, in which case the antenna section (2) will only be composed of antenna coil (10). The matching circuit (11) is to match the impedance of the amplifier connecting the feeder, section (3), with the impedance of the antenna coil (10), and between the two signal wires extending from the antenna coil (10) that are provided with two variable capacitors C1 and C2 connected in series, with a grounded junction.

Figure 4:
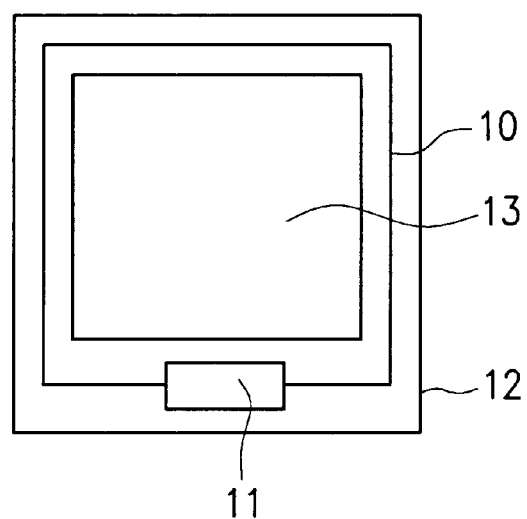
FIG. 4 shows the outlook composition of the antenna section.

As shown in FIG. 4, the antenna coil (10) and the matching circuit (11) are supported by the low permittivity square antenna frame to avoid the influence of parasitic capacitance. The opening (13) is formed at the center of the antenna coil (10) and the antenna frame (12), through which the object for identification and transmission, i.e. books attached with the data carrier tag, can pass. The opening (13) defines a plane in which the antenna coil (10) resides.

Figure 5:
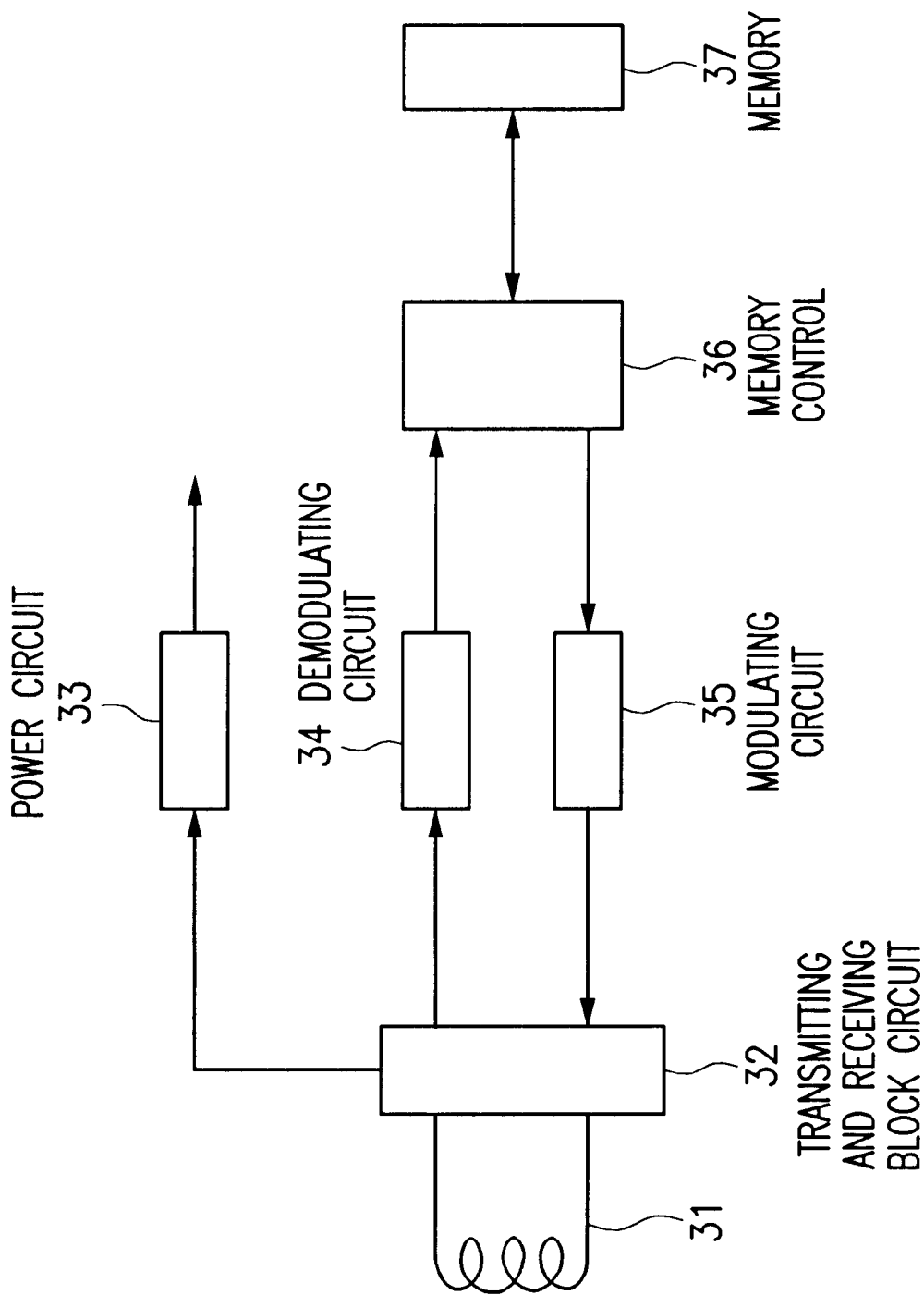
FIG. 5 shows the outlined composition of the tag used in the contactless identification system used in the FIG. 1 embodiment.

Turning to FIG. 5, an embodiment of the tag (data carrier) used in the contactless identification system is shown. The tag (30) comprises an antenna/inductance coil (31), a transmitting/receiving section (32), a power circuit (33), a demodulating circuit (34), a modulating circuit (35), a memory control section (36) and a memory (37).

The signal received by the antenna coil (31) from the identification device (FIG. 1, 1), is routed through the transmitting/receiving section (32) to the power circuit (33) where electric power is obtained to drive or power the sections in the data carrier device. The signal received by the antenna coil (31) from the identification device (FIG. 1, 1) is also routed through the transmitting/receiving section (32) to the demodulating circuit (34), and the signal demodulated therein is transferred to the memory control section (36). The memory control section (36) is connected by bus with the memory (37) where the data is written or read in accordance with the command or data provided by the controller section (4). The data read out from the memory (37) is routed through the modulating circuit (35) to the transmitting/receiving section (32) to drive the antenna coil (31).

In case transmission with the identification device is performed in the load switching method, a modulating circuit is composed with a resistor and a switching element such as FET, etc., in serial connection, to be further connected in parallel with the antenna coil (31), which then enables alteration in the load of the antenna coil by the switching element and transmits the data to the identification device.

The data carrier (30) has a first surface that defines a plane. The surface can be determined by reference to the data carrier tag case (30) top surface as attached to an object. Alternative embodiments can incorporate a data carrier (30)

with a first surface determined by the alignment of the data carrier's induction coil (31) as it is installed within the data carrier tag case (30).

A method used with the object identification means used with this system is explained below. First, set the multiple books (40) attached with a tag in a pile at the predetermined position. At this time, each of the tags is pasted onto the rear face, etc., of the books, and positioned in parallel with the mutual intervals.

Figure 6:
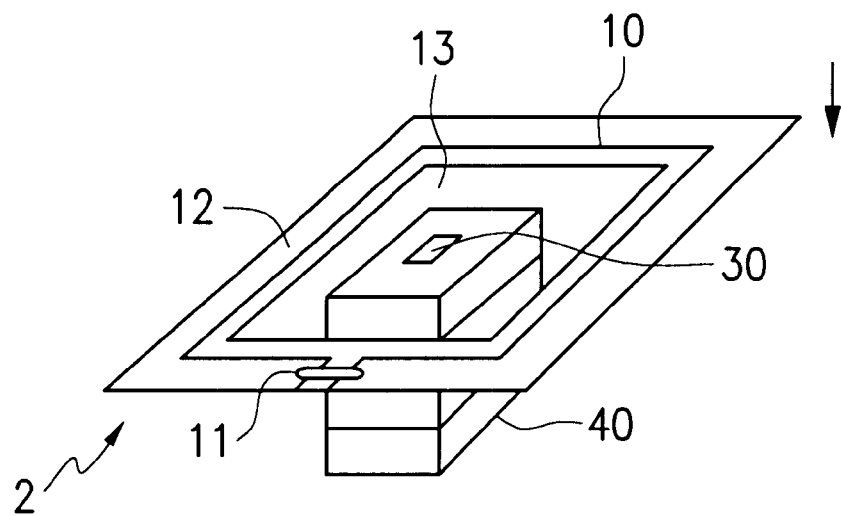
FIG. 6 shows use of the contactless identification system of the FIG. 1 embodiment.

Next, as shown in FIG. 6, the antenna section (2) should be transferred or moved from above to below the piled books so that the piled books (40) pass through the opening (13) at the center of the antenna coil (31). In this manner, each tag on the books (40) crosses a sufficiently strong magnetic force vector in the direction intersecting the inside face or adjacent to the center of the antenna coil (10) at right angles. In other words, the plane defined by the antenna opening (13) is moved so that the angle formed between the opening (13) plane and the plane defined by the data carrier is varied. Consequently, required power is supplied to each of the tags (30), regardless of position, and all tags (30) can be read accurately. In addition, if interference among the tags causes a discrepancy in the resonance frequency, the effects of such interference can be overcome by positioning the antenna coil (10) and each tag (30) in closer proximity by means of the moving antenna coil (10), enabling an accurate reading of each tag (30).

This method further enables the elimination of such manual work as reading the bar code from a label on a book using a hand scanner, and checkout or return process of plural books can be completed in one step.

The transfer or movement of the antenna section (2) may be carried out by manual operations in which, for example, an operator holds and moves the antenna section (2). Antenna section (2) transfer or movement can also be accomplished by means that results in the movement or transfer the antenna section (2) with respect to the data carrier tag (30) which may include using a motor driven pinion incorporated in the antenna section (2) or with a meshing rack incorporated on the table, respectively.

Also, with the fixed antenna coil (10) and an object conveyance or transfer means on which the books are piled, the books may pass through the opening (13) of the antenna coil (10) when the object conveyor or movement mechanism is operated.

Second Embodiment

Figure 7:
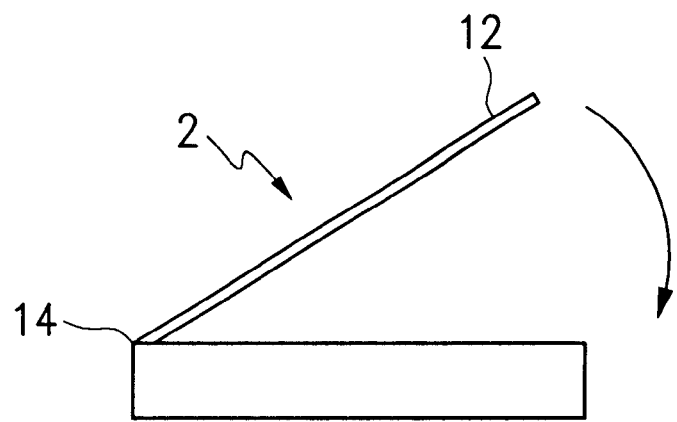
FIG. 7 shows use of the contactless identification system in a second practical embodiment of the invention.

FIG. 7 shows the antenna section (2) in the contactless identification system related to the second practical embodiment. The same symbols are used as in the first formation, for the same composition, and explanations are omitted.

The antenna section (2), while being moved or transferred, is held approximately parallel against the face on which books are set in the first practical embodiment, although the edge of the antenna frame (12) is supported by a movable or shakable structure with hinges (guiding means) in this embodiment.

The method used with this embodiment of the identification means for identifying objects using this system is explained below. First, multiple books (40) with an attached tag should be set in a pile at a predetermined position. The number of readable tags (30) is limited to the extent that the antenna section (2) can be opened/closed with the piled books (40) set at the said position.

With the books (40) set at the position, the open antenna section (2) is to be closed in the arrowed direction. At this time, the position of the piled books (40) is designed so that the books (40) pass through the opening (13) at the center of the antenna coil (10).

During the closing or movement of the antenna section (2), all tags (30) attached to books (40) intersect or cross with the strong magnetic force vector in the direction intersecting at right angles against the inside face or adjacent to the center of the antenna coil (10). Here, the strength of the magnetic force vector in the direction intersecting at right angles against the tag (30) differs according to the angle between the tag (30) and the antenna coil (10).

The antenna section (2) may be moved or transferred in the opening direction from the face parallel to the piled books, in the reverse direction of the closing direction.

Third Embodiment

Figure 8:
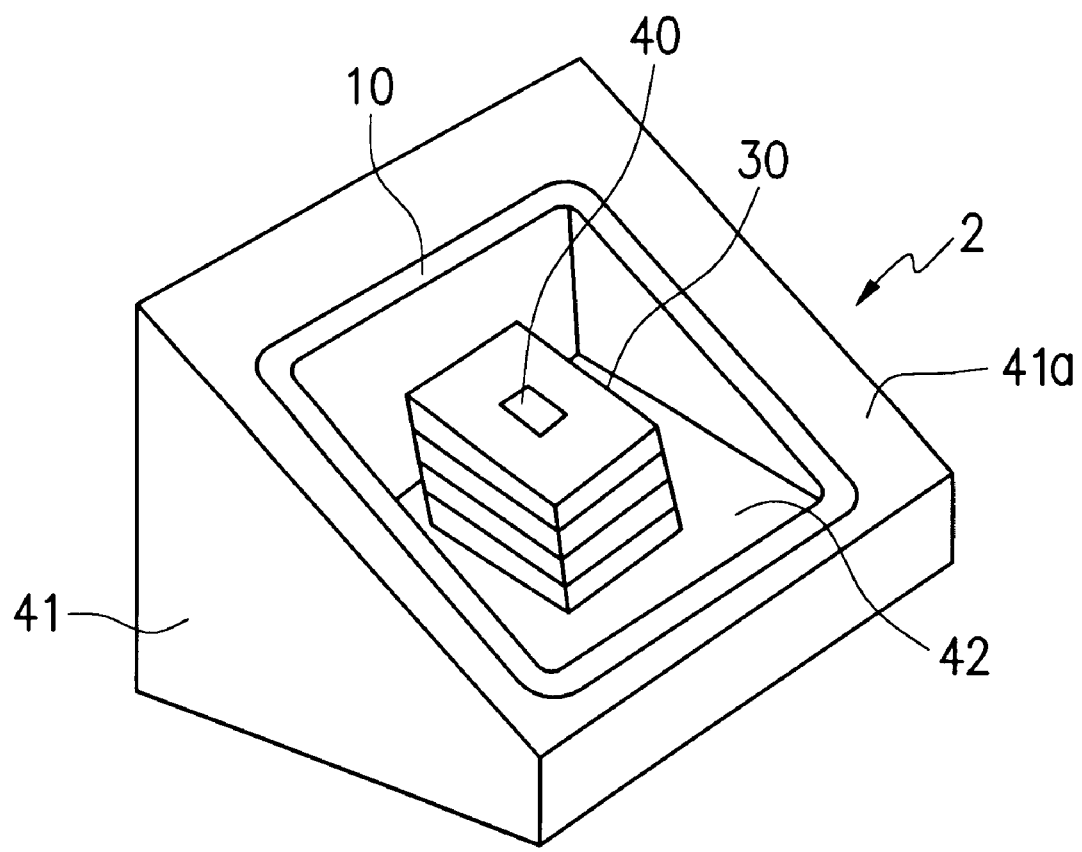
FIG. 8 shows use of the contactless identification system in a third practical embodiment of this invention.
Figure 9:
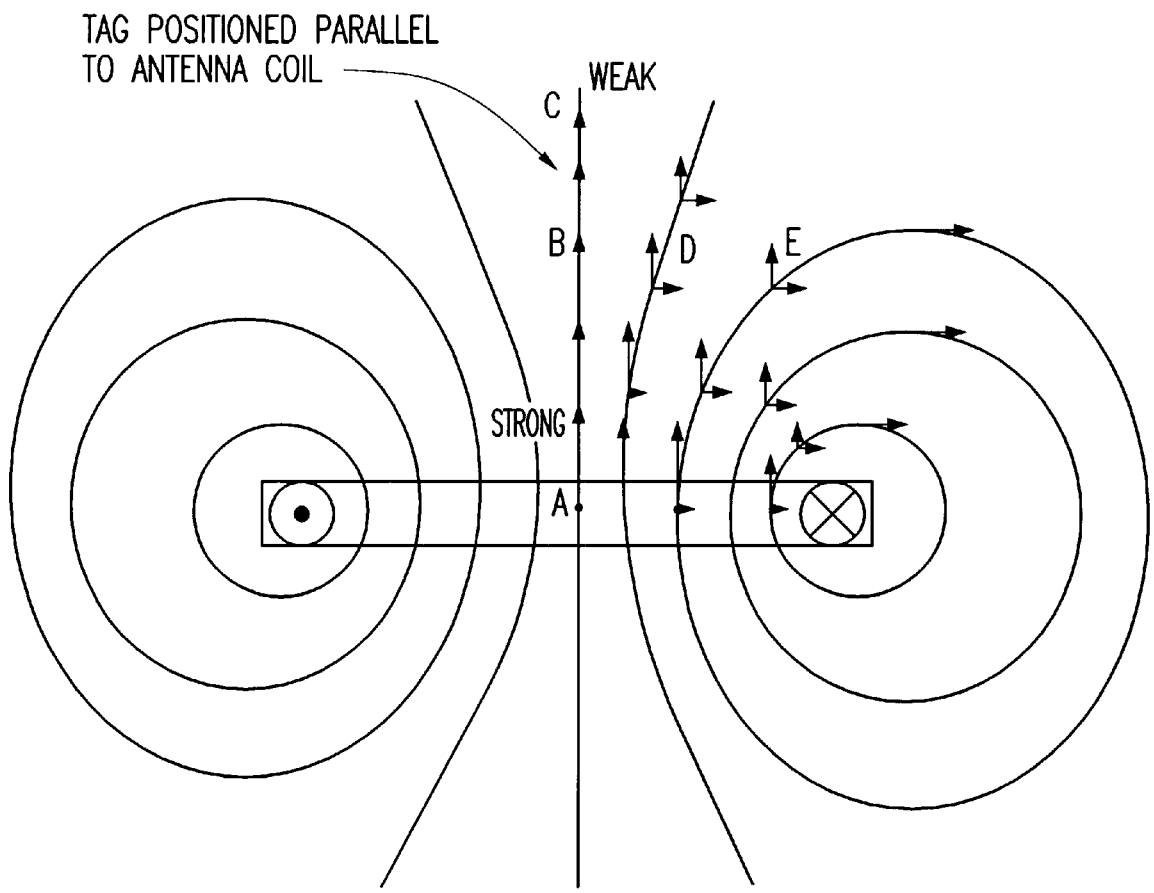
FIG. 9 shows a model of magnetic lines, as generated by the fixed antenna coil.
Figure 10:
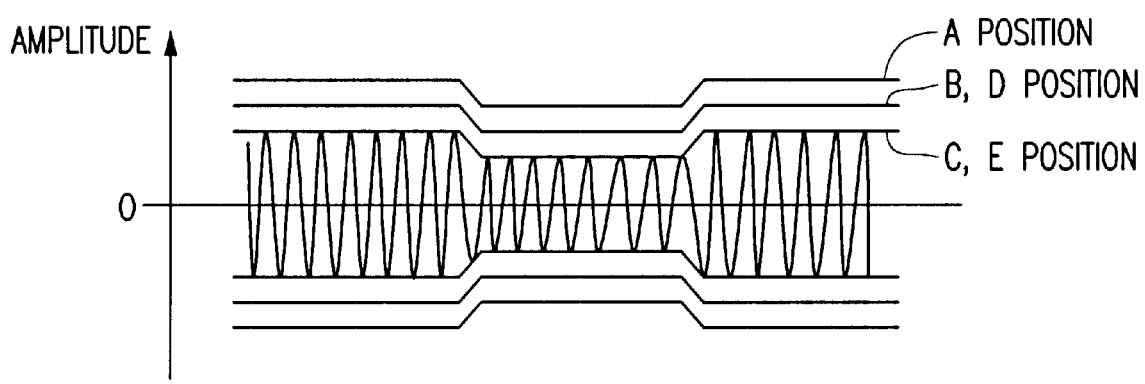
FIG. 10 shows different levels of power supply to the tag at various positions.

FIG. 8 shows the antenna section (2) in the contactless identification system related to the third embodiment. For the same composition as in the first formation, the same symbols are used, and explanations are omitted.

The antenna coil (10) is inclined in this formation against the face of the piled books, although in the first embodiment, the antenna section (2) is transferred or moved while being held approximately parallel to the face of the piled books.

The antenna coil (10) is supported on the upper surface (41a) of the rack (41) inclined with the lower end coming forward to the user. (Here, the antenna section (2) comprises the antenna coil (10) and the rack (41)) A concavity (42) with an opening is created on the upper surface part of the rack (41). The antenna coil (10) may be embedded in the rack (41), not limited to the upper surface (41a) of the rack (41). Alternatively, the concavity (42) may be bored on or into part of the extended surface panel of the rack.

The method used with this embodiment of the identification means of this system is now explained. Multiple books (40) with tags (30) attached are piled and inserted into the concavity from the front or the upper side of the rack (41) to place them at the predetermined position on the bottom face of the concavity. While placing the books (40) on the bottom face in the concavity, the tags attached on the books cross the magnetic field generated by the antenna coil (10), and the tag information is read by the antenna coil (10).

A variety of embodiments of the invention are possible. For example, the antenna coil (10) has a square shape in the above described embodiments, but may be in the shape of a circle etc., but not limited to these, provided an opening is provided at the center. Also, in the above embodiments, tags (30) are fixed onto books but these may also be used in applications such as rental/return of video tapes, CD's (compact disks), DVD's, etc. Moreover, even if multiple data carriers are placed with intervals between them, this invention allows data carriers to pass through the opening at which the magnetic field is strongest as generated by the identification device antenna coil, and reliable transmission and communication is accomplished without data carrier transmission distance insufficiencies. In addition, even if the resonance frequency fluctuates, as the data carrier is transferred through the strongest magnetic field at the opening of the antenna coil, the antenna coil and the data carrier become more closely connected, enabling reliable communication. Thus, while exemplary embodiments of the invention have been described and illustrated, the present invention is not to be considered as limited by such descriptions and illustrations but is only limited by the scope of the appended claims.

What is claimed is:

1. A contactless identification system comprising:
    a data carrier with a first surface, said surface defining a first plane, said carrier adapted to be attached to an object;

an antenna coil with an opening for the passage of said object with attached data carrier through said opening, said opening defining a second plane;

a mechanism which varies the angle between the first and second planes over time while said carrier is within said opening so as to maximize communication between said antenna and said carrier; and a data carrier identification device which communicates with the data carrier through the antenna.

2. The contactless identification system as in claim 1 further comprising a guidance mechanism which guides the objects through the antenna coil opening, wherein said objects are set at a predetermined position so that the objects pass through the opening.

3. The contactless identification system as in claim 1, wherein the mechanism which varies the angle between the first and second planes comprises a guidance mechanism which moves the objects with attached data carriers through the opening.

4. The contactless identification system as in claim 1 further comprising an antenna position transfer mechanism to move the antenna coil so that the objects pass through said antenna coil opening.

5. The contactless identification system as in claim 1, wherein the mechanism which varies the angle formed by the intersection of the first and second planes comprises an antenna positioning mechanism which moves the antenna so as to pass the objects through said antenna coil opening to one or more predetermined positions.

6. A contactless identification system comprising:

a data carrier adapted to be attached to an object;

an antenna coil with an opening for the passage of said object with attached data carrier through said opening;

an apparatus which varies the vertical distance between the center of said antenna opening and said data carrier with respect to each other to ensure required minimum distance between said antenna and said carrier needed to effect tag and antenna communication; and a data carrier identification device which communicates with said data carrier through said antenna.

7. An antenna coil within the antenna section of the contactless identification system comprising:

an antenna section, to transmit with a data carrier, with an opening in the antenna coil through which objects, with said carrier attached, pass;

a mechanism for controlling the angle defined by the intersection of a plane defined by the antenna opening and a plane defined by a surface of a data carrier attached to an object passing through said opening; and said mechanism movements are predetermined to maximize the power induced in said data carrier's induction coil antenna, as said carrier moves through said opening.

8. A method to identify objects using a contactless identification means to comprising:

performing transmission between a data carrier attached to an object, an antenna coil possessing an opening and a contactless identification mechanism; and performing transmission with the data carrier by varying the angle formed by an intersection of a plane defined by the data carrier attached to said objects and plane defined by the antenna coil opening while passing said object through said opening.

9. The method of claim 8, further comprising:

holding the angle of the two planes at one or more predetermined angles while said objects pass through said opening.

10. A method as in claim 8, wherein the step to perform transmission with the data carrier by varying the angle between two planes further comprises:

setting the objects at one or more predetermined position; and moving said antenna coil, so that each data carrier attached to the objects passes through said opening.

11. The method of claim 8, further comprising:

moving said antenna coil so that each data carrier attached to said objects passes through the opening; and shaking the antenna coil around a shaft supporting the antenna coil thereon, with room allowed for shaking.

12. A method to identify objects using a contactless identification means comprising:

generating a magnetic field from the antenna coil;

varying the angle formed by the intersection of a plane defined by a data carrier surface and a plane defined by an antenna coil opening;

passing an object with the data carrier attached through the antenna coil opening; and performing transmission between said data carrier, an antenna coil with an opening and the contactless identification means while passing said object through said opening.

13. A method as in claim 12, further comprising conveying the objects to one or more predetermined positions with respect to the antenna opening for passage through said opening.

14. The method of claim 13, further comprising:

positioning said antenna coil so that each data carrier attached to the objects passes through said opening; and shaking the antenna coil around a shaft supporting the antenna coil thereon, with room allowed for shaking.

15. A contactless identification system comprising:

a data carrier adapted to be attached to an object;

an antenna coil for generating a magnetic field, transmitting and receiving signals from said carrier;

said antenna coil surrounding an opening for the passage of said object with attached data carrier through said opening;

said antenna coil is mounted such that a plane defined by the antenna coil opening is formed at an angle not perpendicular to a plane defined by said object's axis of movement through said opening; and a data carrier identification device which communicates with the data carrier through said antenna.

16. A contactless identification system of claim 15, wherein the antenna coil opening comprises an opening in a concavity that said object is passed into.

17. A contactless identification system comprising:

a data carrier adapted to be attached to an object;

a portable frame with an opening through which said objects are passed;

an antenna coil, mounted into said frame in such a manner that said antenna coil surrounds said opening; and a data carrier identification device which communicates with said data carrier through the antenna.

18. A method for identifying objects using a contactless identification system comprising:

attaching a data carrier tag to an object;

manually moving a portable frame with an antenna coil whereby said object is passed through an opening in said antenna coil; and performing transmission between the data carrier, said antenna coil and a contactless identification mechanism.

19. A contactless identification system comprising:

a data carrier adapted to be attached to an object, said carrier has a first surface defining a first plane;

an antenna coil with an opening for the passage of said object through said opening, said opening defining a second plane;

said antenna coil opening plane is positioned with respect to the second plane so that both said data carrier plane and said antenna opening plane are parallel when said object is passed through said opening;

a mechanism to pass the object through the opening; and a data carrier identification mechanism which communicates with said data carrier through said antenna while the object is passed through said opening.

20. A contactless identification system as in claim 19, wherein the data carrier is a flat tag.

21. A contactless identification system as in claim 19, wherein the antenna coil opening plane is perpendicular to a vector defined by Earth's gravity and the data carrier plane is parallel to said opening.

22. A method for identifying objects using a contactless identification system comprising:

positioning an object with said attached data carrier so that said object surface with the attached data carrier is parallel to the plane of an antenna coil;

moving an antenna coil whereby said object with said attached data carrier is passed through an opening in said antenna coil; and performing transmission between the data carrier, the antenna coil with an opening and a contactless identification means.

23. A method for identifying objects using a contactless identification system comprising:

positioning an object having an attached data carrier so that the object surface with the attached data carrier is parallel to the plane of an antenna coil;

moving said object through an opening in the antenna coil; and performing transmission between the data carrier, said antenna coil and a contactless identification means while passing said object through said opening.

* * * * *